United States Patent [15] 3,636,624

Bates [45] Jan. 25, 1972

[54] METHOD AND APPARATUS FOR INSERTING LEAD COMPONENTS INTO CIRCUIT BOARDS

[72] Inventor: Erwin F. Bates, Binghamton, N.Y.

[73] Assignee: Universal Instruments Corporation, Binghamton, N.Y.

[22] Filed: Feb. 19, 1970

[21] Appl. No.: 12,690

[52] U.S. Cl. ....................29/626, 29/203 B
[51] Int. Cl. ....................H05k 3/30, H05k 13/04
[58] Field of Search ....................29/626, 203 B, 203 D, 211, 29/211 D

[56] References Cited

UNITED STATES PATENTS 3,056,446 10/1962 Schmidt et al. ....................29/203 D
3,443,298 5/1969 Romeo ....................29/626 X
3,545,606 12/1970 Bennett et al. ....................29/203 B

*Primary Examiner*—Thomas H. Eager
*Attorney*—Fidelman & Wolffe

[57] ABSTRACT

An apparatus and method for inserting taped resistors of the type having at least two leads and like components into printed circuit boards. The apparatus comprises a feed mechanism utilizing a rotating feed wheel which in the method places components into engagement with the jaws of an insertion head whereupon the insertion head cuts the component from the tape and carries the component down to a position directly over its insertion position on the circuit board and a pusher rod forces the component or resistor down into the circuit board as the jaws separate.

22 Claims, 14 Drawing Figures

INVENTOR.
IRWIN F. BATES
BY
Fidelman, Wolffe + Leitner
ATTORNEYS

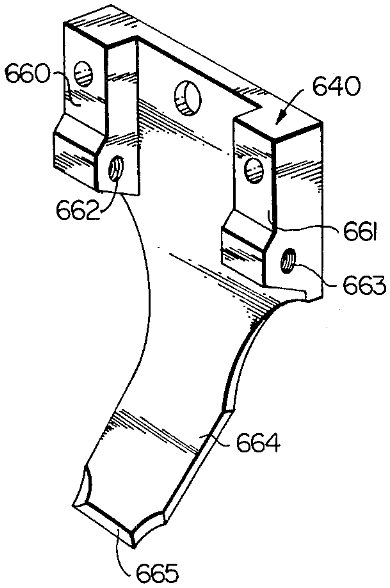
FIG. 12
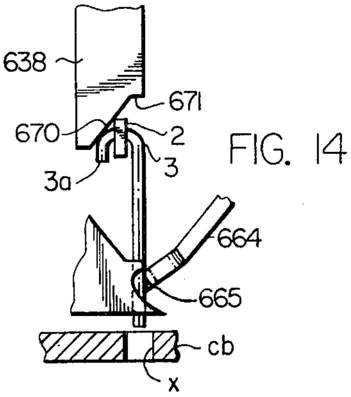
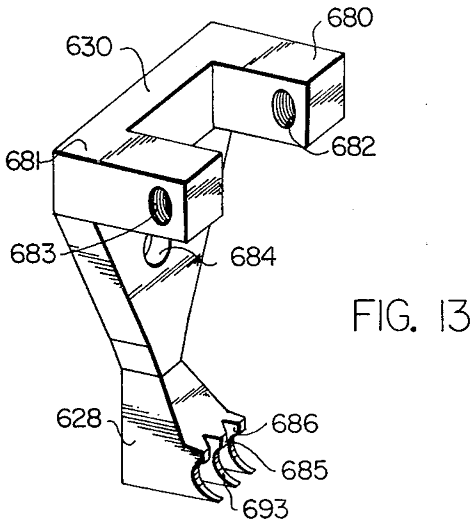

METHOD AND APPARATUS FOR INSERTING LEAD COMPONENTS INTO CIRCUIT BOARDS

This invention relates to an insertion apparatus and method for inserting resistors and like components having leads extending from the body thereof in one direction, preferably with parallel axis leads, into printed circuit boards.

One of the problems previously encountered in the electronic component insertion industry has been accurately placing components without disturbing the alignment of the component leads. Bent or misaligned leads result in a high rate of rejects and possible injury to the insertion mechanism.

Another problem encountered in the industry has been the lack of a simple and accurate mechanism to insure correct placement of the components within printed circuit boards.

Machines developed in the past have been expensive, cumbersome and are generally not satisfactory for extended operation.

Accordingly, it is an object of the present invention to provide an improved component insertion mechanism which reduces the complexity of the insertion operation and increases the speed of the operation. A further object of the present invention is to provide a mechanism for quickly and accurately inserting resistors into electrical circuit boards.

It is a further object of the invention to provide an insertion apparatus which has a horizontally slidable feed mechanism employing a rotatable feed wheel and a vertically reciprocal insertion head having jaws which separate when the component is directly above its insertion position and a pusher rod which forces the component down into the circuit board and holds the leads in place for cutting and clinching operations.

One jaw moves out of the path of the pusher and the other stays in position and acts as a guide during the insertion stage of the operations.

It is a further object of this invention to provide a resistor inserter mechanism having novel and simple lead severing means.

It is a still further object of this invention to provide a resistor inserter mechanism with a unique and novel resistor feeding and indexing means.

It is a still further object of this invention to provide a fully automated mechanism for taking resistors having their leads taped, cutting the surplus lead material and tape away and inserting said cut leads into a circuit board.

Other objects and the nature and advantages of the present invention will be apparent from the following description taken in conjunction with the accompanying drawings, wherein:

FIG. 12 is a perspective view of the guiding jaw;

FIG. 13 is a perspective view of the cutting jaw; and

FIG. 14 is a view illustrating the position of driver head and jaws during insertion.

Figure 8:
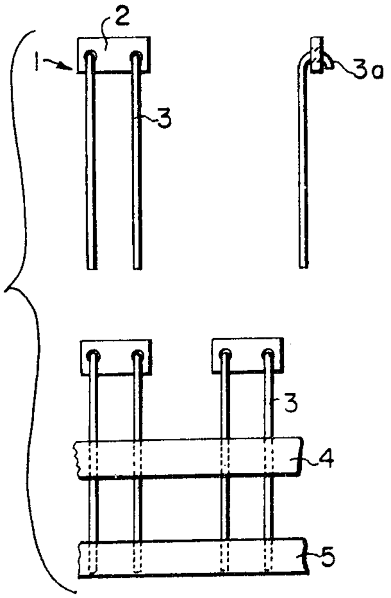
FIG. 8 is a view of a sample resistor individually and on tape.

FIG. 8 shows a typical resistor 1 having a rectangular body portion 2, and twin parallel leads 3 extending from one side thereof. The leads bend and pass through body 2 and are clipped as at 3*a*. The leads are placed on tapes, such as 4 and 5 prior to usage. This taping is an easily handling method and helps to keep the leads aligned and parallel.

Figure 1:
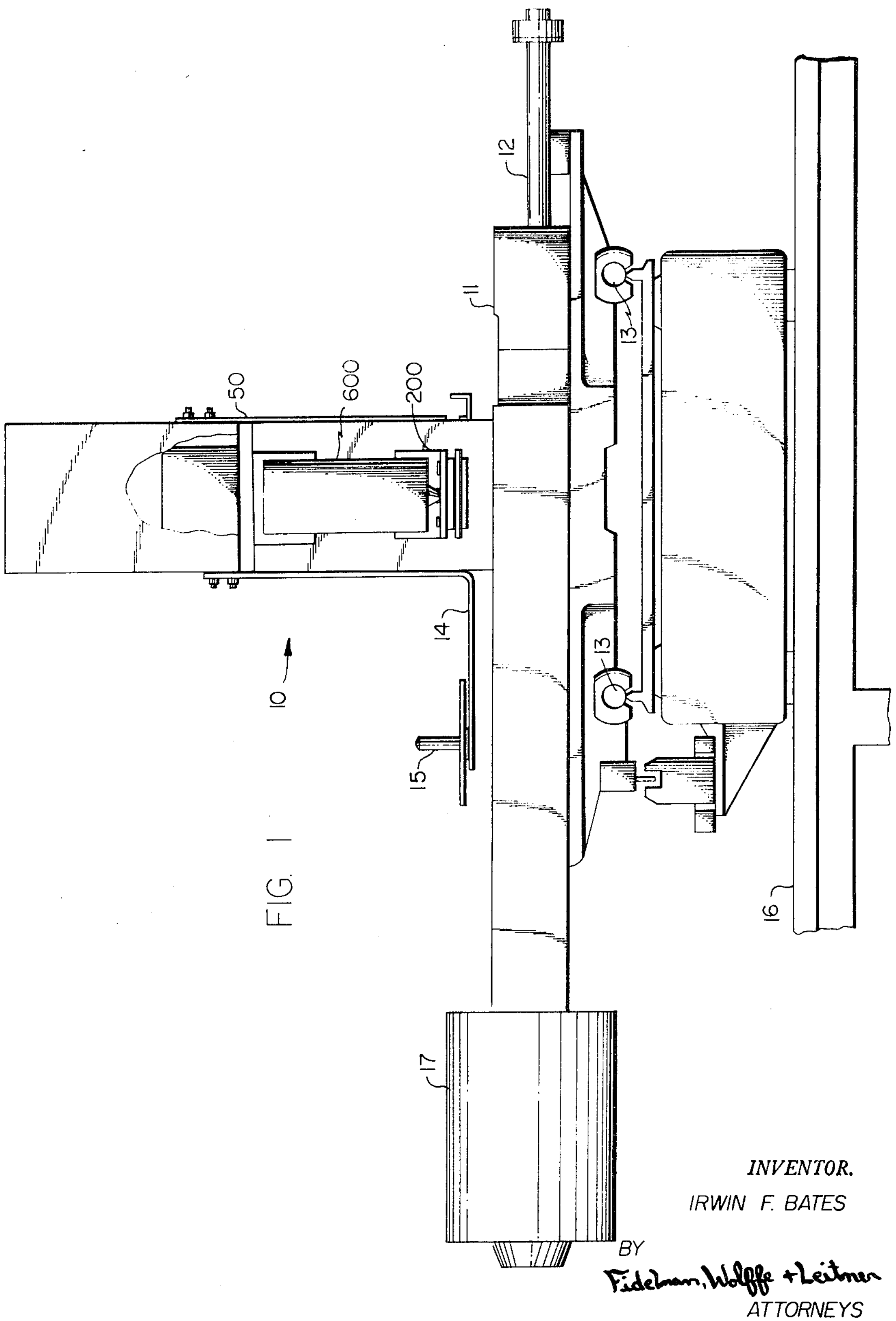
FIG. 1 is a view of the overall apparatus.

The insertion apparatus is shown generally as 10 in FIG. 1. It consists of an insertion head assembly 600, a feed assembly 200 and a cantilever 50. The insertion head assembly 600 is mounted between the ends of cantilevered sideplates 202 between which resides feed assembly 200. The feed assembly 200 and sideplates 202 are mounted on a parallelogram-type worktable 11, on which a circuit board is adapted to be mounted for movement in an X–Y plane along rods 12 and 13. A reel support member 14 extends from the insertion apparatus and a spool 15 for feeding rolls of taped resistors into the feed mechanism where they are cut from the tapes and inserted into the circuit board. A numerically controlled apparatus (not shown) positions the circuit board carrying table under the insertion head in exactly the right position at the right time for the insertion strobe of the insertion apparatus 600. The parallelogram worktable is mounted on a main table. A motor 17 is provided on one edge of the table 11 to move it in the appropriate sequence.

Figure 2:
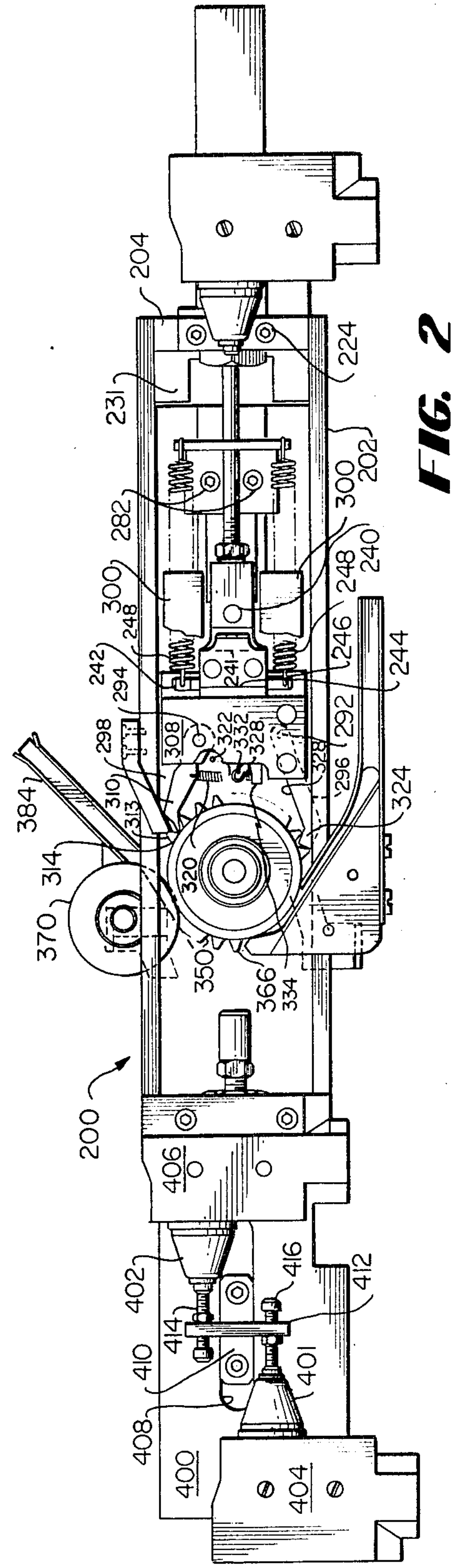
FIG. 2 is a plan view of the feed mechanism of the machine showing portions of the slide mechanism broken away.

Referring now to FIG. 2, there is shown the feed mechanism designated generally as 200. The mechanism is contained within a pair of sideplates 202 which are joined together at one end by member 204 and the other end by plate 206 and member 208. The plates are shown in side view in FIG. 3 and it can be seen that they consist generally of a base portion 210 with an extending arm section 212 which is cantilevered out from section 210. Positioned within section 210 is aperture 214. A baseplate 216 extends from one plate 202 to the other across from the bottom section of 210. Mounted in member 204 is an air cylinder 220. A piston rod 222 extends from the forward end of cylinder 220 to a position intermediate the sideplates 202. Mounted on top of member 204 by bolts 224 is a plate 226 on which is secured a microswitch 228. The purpose of microswitch 228 will be discussed later.

Mounted at the base of member 204 is a threaded stop member 230. The stop member is secured to a shaft 288 which passes through a stop block 231. The stop block 231 is secured to baseplate 216 by any suitable means such as by bolts 232.

Figures 4, 5:
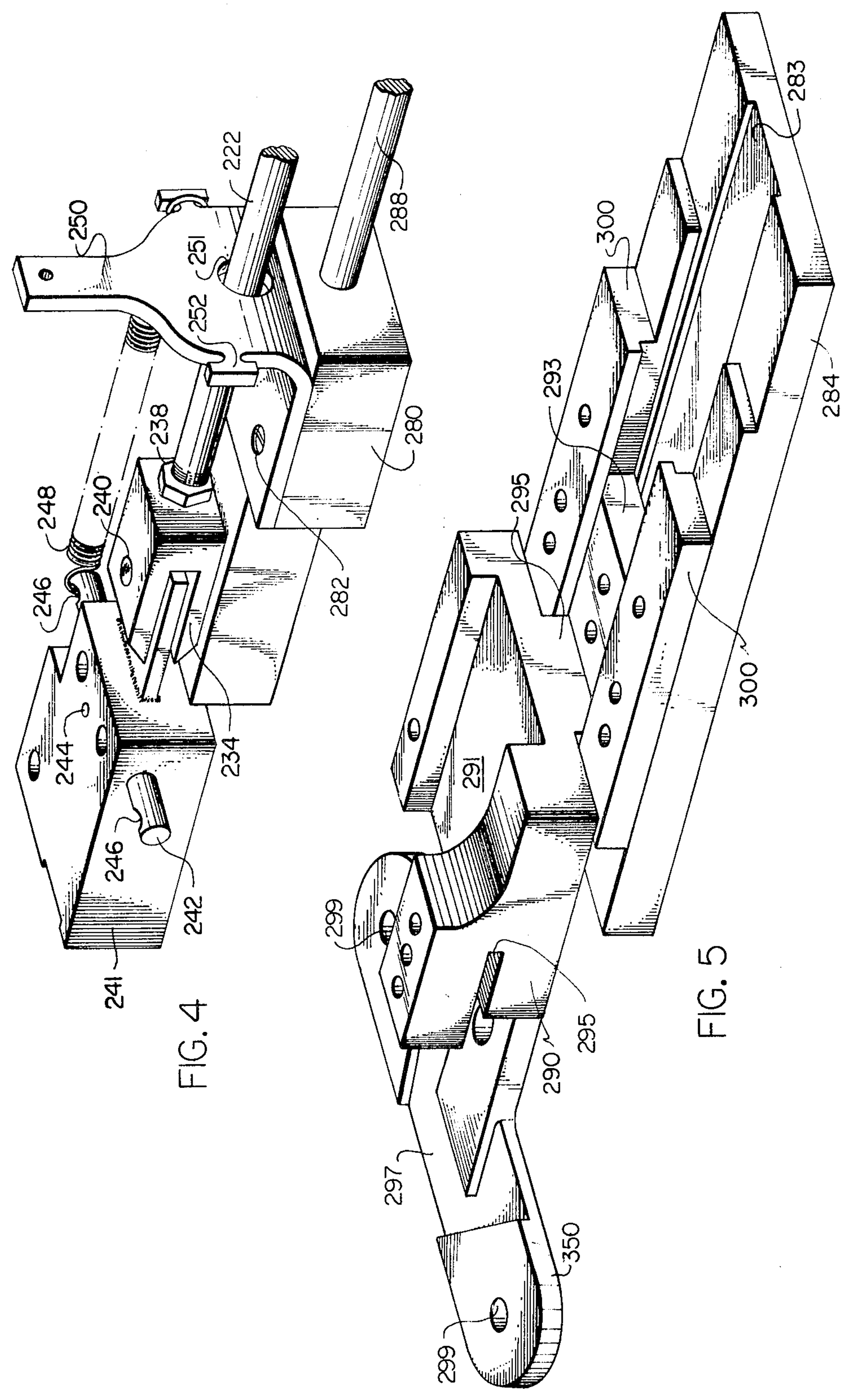
FIG. 4 is a perspective view of the slide member piston rod, clevis and their general arrangement.
FIG. 5 is a perspective view of the slide blade and slide base.

Referring to FIG. 4 now, piston rod 222 is threaded into a clevis 234 and held in position by means of a nut 238. Clevis 234 has a dowel 240 extending vertically therethrough. The dowel 240 secures an extension portion 242 of member 241 for pivotal movement to the clevis. Member 240 also has a pin 242 extending laterally and horizontally therethrough and a roll pin 244 secures pin 242 against rotation. Pin 242 has two vertical notches 246 in the ends thereof. Attached to and extending from pins 242 are springs 248 which are connected at their other ends to a plate member 250 by means of relieved and projecting portions 252. Plate member 250 has an aperture 251 through which passes rod 222. Adjustably mounted by nut 254 at the top of plate 250 is contact member 256. A plate 260, similar to plate 250, is mounted on top of member 241 by bolts 262. A threaded contact member 264 is threadably engaged with the top of plate 260 and held in position by nut 266. Contact member 264 engages a projection 268 on microswitch 270 and contact member 256 engages a projection 272 on microswitch 228. The purpose for the contacts and the microswitches will be discussed later.

Plate member 250 is mounted on a slide member 280 by means of bolts 282. Member 280 is mounted in groove 283 in slide plate 284. A horizontally extending aperture 286 and member 280 receive a shaft 288 which is threadedly connected to stop member 230 at its end. Mounted on each side of piston rod 222 and on the baseplate 210 is stop block 231. Thus, it will be seen that member 280 may move with slide plate 284 rearwards until it engages stop block 231.

Figure 6:
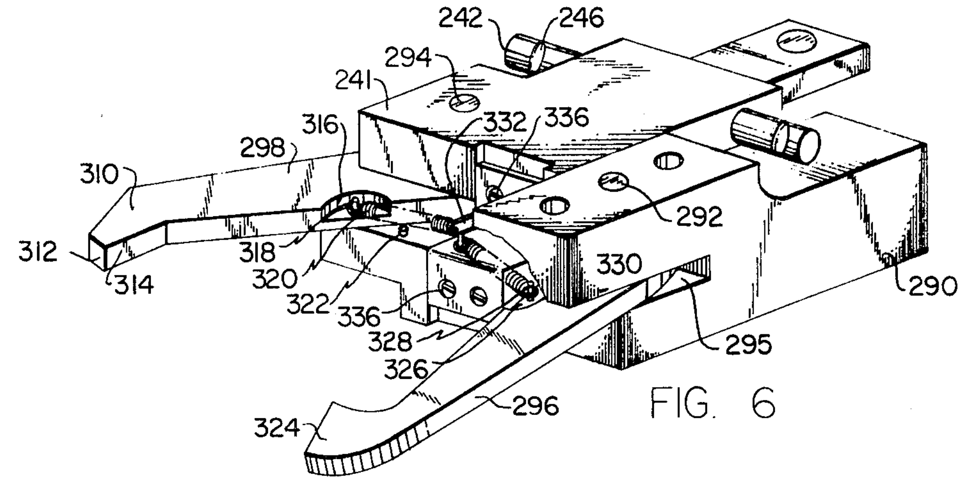
FIG. 6 is a perspective view of the slide member and the slide block showing their interrelationship and the index and feed pawls.

Slide member 241 contains dowel 294 on which index feed pawl 298 is respectively mounted (See FIG. 6). The slide member 241 is mounted for sliding movement in a slide block 290.

Slide block 290, as shown in FIG. 5, has a groove 291 in which slide member 241 is adapted to slide. It is attached to a slide square 293 by a lower extension 295. Slide square 293 is maintained in groove 283 by gibs 300 which are attached to member 284 in any suitable manner.

A cover plate 304 (FIG. 3) secures member 241 in groove 291 of block 290. Plate 304 is secured to the top of block 290 by bolts 306. Block 290 has a horizontal slot 295 therein for index pawl 296 which is held in place by dowel 292.

The front portion of slide square 293 is T-shaped as shown clearly in FIG. 5. There is a relieved area 297 and holes 299 in the T-shaped end portion for a purpose later to be described. Pawl 298 extends away from dowel 294 and has a pawl projection 310 at the end thereof with surfaces 312 and 314 which are adapted to engage the sides of the teeth of the index wheel. Pawl 298 has a relieved area 316 with a projection 318 therein for securement thereto of a spring member 320 which tends to bias pawl 298 toward a centering position. A roll pin 322 limits the inward travel of pawl 298. Pawl 296 has a projecting end portion 324 which is adapted to engage between the teeth of the index wheel as shown in FIG. 2 and still allow the pawl to ride over the inclined surfaces of the teeth during movement of the slide block. Pawl 296 also has a relieved area 326 and a pin 328 to which is attached a biasing spring 330 for biasing the pawl inwardly. Both springs 320 and 330 are connected to a projection on slide block 290 such as member 332. A guide member 334 is provided for spring 330.

Figure 3:
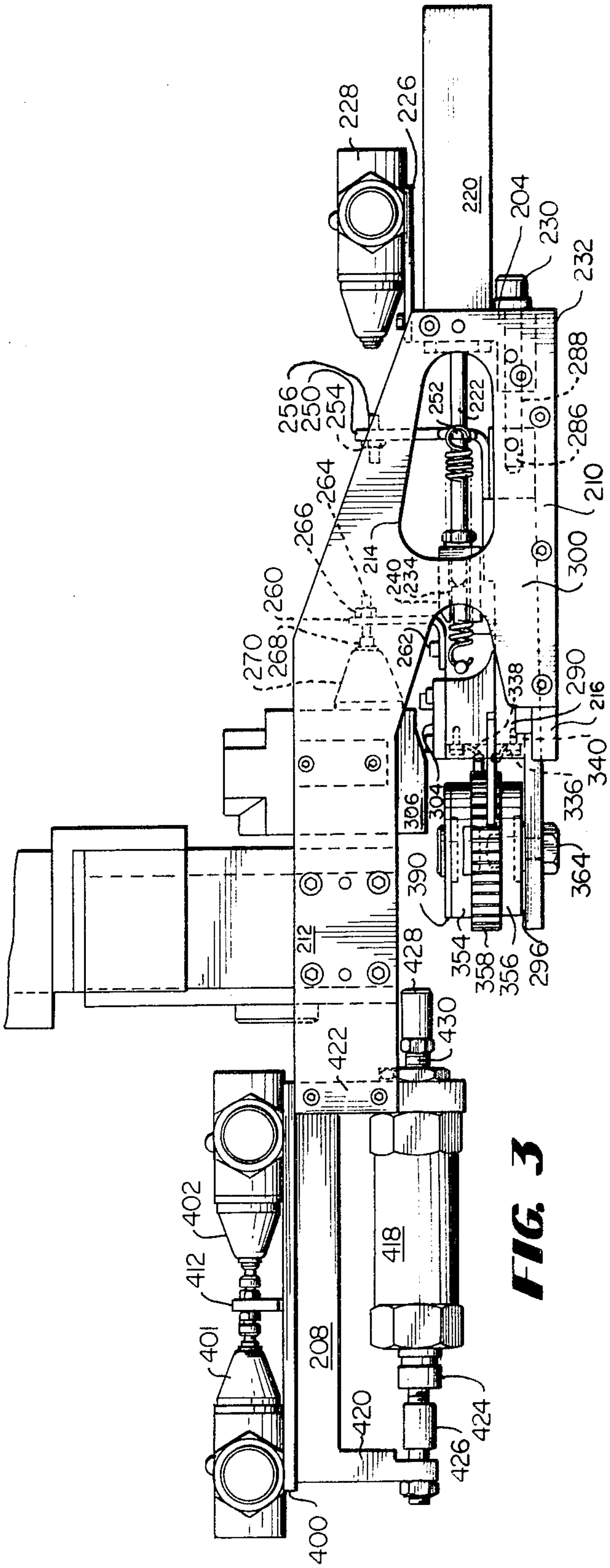
FIG. 3 is a side view of the feed mechanism of FIG. 2 showing the relative positions of the feed slides in the air cylinders.

A guide member 332 is connected to slide block 290 by any suitable means such as by screws 336. A similar spring securement member 338 may be provided for the other spring and secured to slide block 290 by bolts 340, as shown in FIG. 3.

As shown in FIG. 2, slide square 293 has a generally T-shaped extension 350. Centrally mounted on the T-shaped extension is an index wheel 352. Index wheel 352 consists of an upper section 354 and a lower section 356 and a central gear section 358. Upper and lower sections 354 and 356, respectively, are connected together and with central gear sections 358 by means of bolts (not shown). The index wheel is mounted by means of bushings (not shown) onto a central bolt shaft 364 for rotation thereabout. Teeth 366 project outwardly from central gear member 358.

Figure 7:
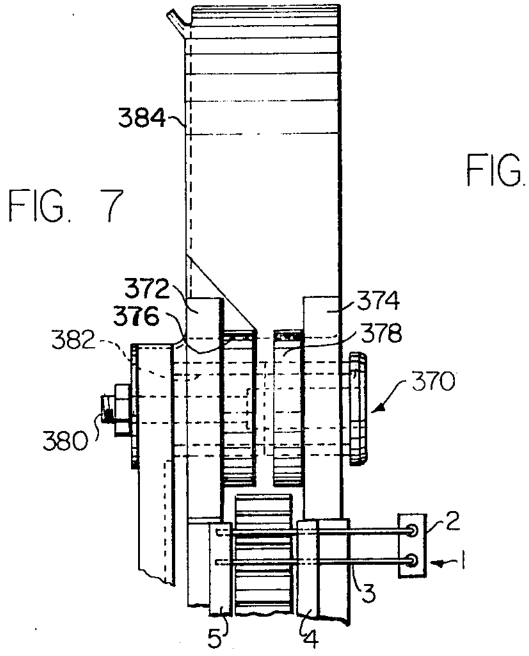
FIG. 7 is a partial side view of the resistor magazine and the feed roller.

Mounted on the end of one of the arms of T-section 350 is roller wheel 370. Roller wheel 370 consists of two rollers as shown in FIG. 7, 372, and 374 having reduced portions 376 and 378, respectively. The rollers are mounted on a shaft 380 by means of bushings 382 and the like. A feed chute 384 is attached to section 350 in any suitable manner. A magazine carrying the resistors is inserted into the feed chute. Such magazines, not shown, are spring biased and feed resistors into contact with the roller. The roller then feeds them into inner engagement with the teeth of the index wheel. The roller is made of any suitable resilient material such as rubber, resilient plastic, or the like.

A resistor 1 is shown in position on the index wheel with tapes 4 and 5 on each side of gear portion 358.

Member 208 is attached to plate 400 and has microswitches 401 and 402 mounted thereon by plates 404 and 406. A slot 408 in plate 400 has an adjustment member 410 therein with a perpendicular extension 412. Each end of the extension has adjustment screw 414, 416 threaded therein. Member 410 is connected to member 208.

A cylinder 418 is mounted between depending portions 420 and 422. Adjustment nut 426 is mounted on cylinder shaft 424 and a punch 428 is located on the opposite end on threaded shaft 430. Punch 428 is adapted to be activated to force a portion of a jaw to hit the leads 3 of a resistor 1 against a cutting edge 390 on the circumference of portion 354 of index wheel 350.

The operation of the device is as follows: A microswitch (not shown) is activated and the slide block 290 and slide member start forward along with the T-section of slide square 293. When stop 230 hits the member 204, member 293 and block 290 cease their forward movement. However, slide 241 continues to move forward and pawl 298 advances the index wheel and rotates a resistor into position. It rotates the index wheel two notches. A jaw (to be described) of the insertion head hits the leads of the positioned resistor and severs them. The piston in cylinder 418 then returns and microswitch 401 is made by the action of member 208. When 600 has begun its operation, the slide then returns and microswitch 228 is made by screw 256 before insertion assembly 600 begins its downward stroke. The slide has fully retracted thus activating microswitch 228 which signals that the slide is out of the way.

During this time pawl 296 holds the index wheel against rotation.

INSERTION HEAD ASSEMBLY 600

Figures 9, 10:
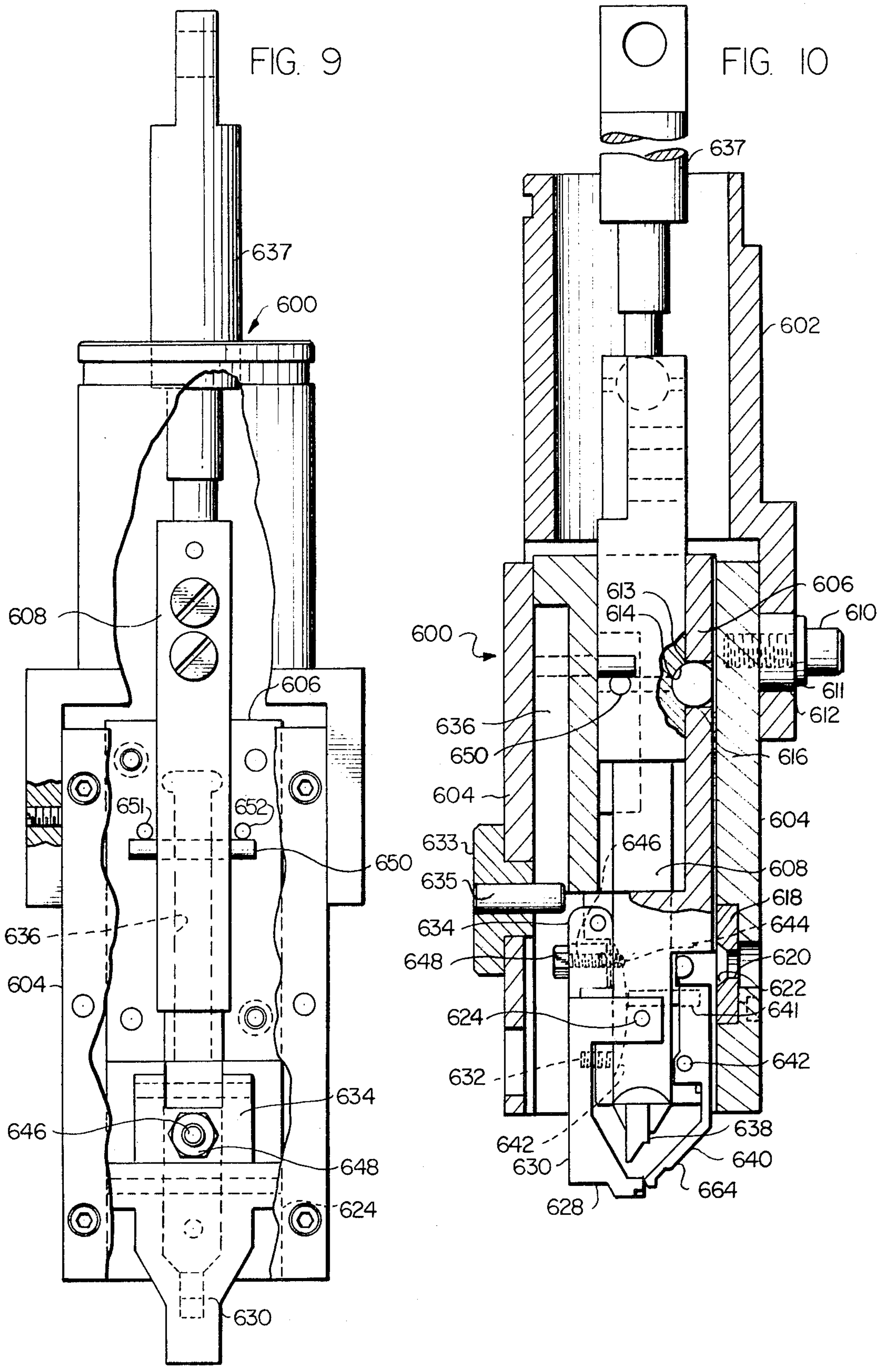
FIG. 9 is a front view of the insertion head mechanism with portions broken away to show the relative position of the catch and jaw assembly.
FIG. 10 is a side view of the insertion head mechanism of FIG. 9 with parts in section showing the relative location.
Figure 11:
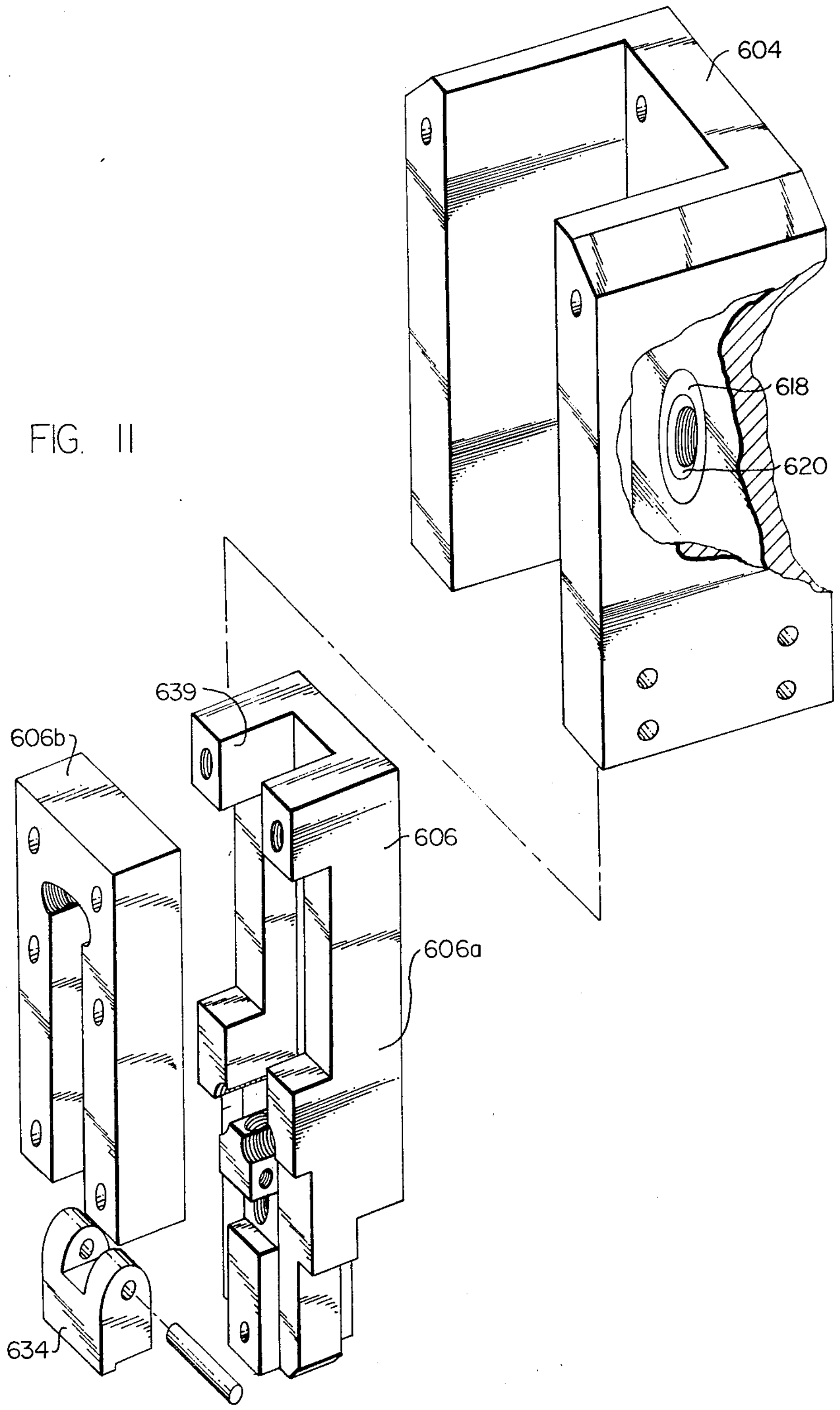
FIG. 11 is an exploded perspective view of some of the portions of the insertion head assembly.

The insertion head assembly is generally designated as 600 in FIGS. 9–11. It consists generally of a mounting 602 which is a C-frame, a housing 604, a slide member 606 and a pusher rod 608. The housing 604 is mounted to frame 602 by a bolt 610, washer 611 and slot 612 in frame 602. For adjusting the assembly for vertical dimensional variations caused by continued operation or by inserting different sized resistors, the bolt is merely loosened and the housing slid up or down.

Slide member 606 and pusher rod are held together for vertical movement by ball 613, preferably made of hardened steel. The ball normally resides in a relieved concave area 614 in pusher rod 608 and a cylindrical aperture 616 in slide member 604. An insert member 618 is located near the bottom of slide holder 604 and contains an aperture 620 for receiving steel ball 213 when the combined pusher rod and slide holder reach that position. Shear force pushes the ball out of the relieved area 614 of pusher rod 608 and into engagement with the relieved area 622 of insert 618. Mounted on a dowel 624 on slide member 606 is a clenching jaw 630. The clenching jaw is generally C-shaped with a lower projecting portion 628. A spring 632 biases jaw 630 outwardly from pusher rod 608 and is shown in FIG. 10 as being received in apertures in the respective members. A catch member 634 is mounted for pivotal movement around dowel 636 on slide member 606. Catch 634 is also biased so that upon the slide member reaching a predetermined position it will bias outwardly, thus allowing jaw 630 to pivot outwardly. Mounted on the end of pusher rod 608 is a driver 638 for driving the component into a circuit board once the component has been carried down by the jaws and the leads have entered predrilled holes in the printed circuit board.

Mounted for pivotal movement around dowel 642 in slide member 606 is jaw 640. Jaw 640 is biased against jaw 630 by the action of spring 641 which is housed in apertures in jaw 640 and pusher rod 606. Jaw 640 can only pivot a few thousandths of a degree.

An insert 633 containing a dowel 635 is located in one side of housing 604. The slide member 606 has a slot 636 in one portion thereof. As shown in FIG. 11, member 606 is composed of two portions 606*a* and 606*b* connected together by bolts or the like. A central passage 639 therein affords sliding movement of pusher rod 608.

When slide member 606 has reached the point at which dowel 635 engages the top of the slot 636, the shear force transfers from its initial position into recessed portion 622.

The latch 634 swings out from its position shown in FIG. 10 to allow jaw 630 to swing out to allow an insertion member 638 on the pusher to engage the component and thrust it home. The latch swings out when a projection thereon 644, rides out of a relieved groove 642 in pusher rod 608. Projection 644 is actually the end of a screw 646 which has an adjustment nut 648 on the other end thereof to allow adjustment of the projection.

Dowels 650, 651 and 652 are placed on slide 606 and pusher rod 608. Dowel 650 is in rod 608 and dowels 651 and 652 in the slide member 606. These dowels limit the amount of relative travel between the two members.

The jaw members 630 and 640 are shown in FIGS. 12 and 13. Jaw 640 has two raised portions 660, 661 which contain the apertures 662, 663 for the dowel 642. The end portion 664 of jaw 640 is angled inwardly and has a beveled edge 665 which assists in directing the resistor leads into a circuit board as shown in FIG. 14.

FIG. 14 shows the end of driver 638 and its relationship to a resistor to be inserted. As shown, the driver has a beveled surface 670 terminating in a short horizontal surface 671. The top of a component body 2 tends to rest on the surface 671 while the bent portion of lead 3 engages surface 670. In cooperation with the guiding surface 665 of jaw 640 and surfaces 686 of jaw 630 the resistors are guided in.

Jaw 630 is used to first sever the resistors from their surplus lead material and tapes 4 and 5 and then to hold the resistor together with jaw 640 until after lead 3 has started to enter hole X in circuit board CB the final insertion stages when driver 638 takes over.

Two raised portions 680, 681 on jaw 630 have apertures 682, 683 for receiving dowel 624. A depressed area 684 receives the end of biasing spring 632. The end portion 628 of the jaw have two notches 685, 686 to grasp each side of the leads as they are severed. These notches also position the leads for insertion into predrilled holes X.

In operation, the resistors, after being cut from the tapes 4 and 5 are held between jaws 630 and 640. Pusher rod 608 then begins its downward travel, carrying along slide 606, and consequently, both jaws in the same position. When ball 613 pops into recess 622 and dowel 635 stops 606, rod 608 continues down. Projection 644 on screw 646 rides out of slot 642 and latch 634 pivots clockwise, thus allowing spring 632 to force jaw 630 clockwise away from the component. At this moment, the component has entered the circuit board and driver 638 drives it in while surface 665 of jaw 640 guides it. I.e., before latch 634 begins to pivot, leads 3 have already entered the circuit board. Any suitable type of clinching mechanism may be employed under the circuit board to secure the resistors if desired, or they may be simply soldered.

The guiding function of jaw 630 is provided by a horizontal notch 693, as seen in FIGS. 13 and 14, which cut across notches, 685 and 686. This allows straight edge 665 of jaw 640 to wedge leads 3 into notches 685 and 686.

While applicant has shown and described a preferred embodiment of his invention, it is understood, of course, that many modifications within the skill of one knowledgeable in the art may be made without departing from the scope of the appended claims.

What is claim is:

1. An electronic claimed insertion apparatus for inserting multiple lead components having their component leads extending parallel from one side of the component body into circuit boards and the like, said apparatus comprising a component supply means for feeding taped components, a component indexing and positioning mechanism, a component lead severing means adapted to sever surplus lead material from the component, a component insertion means having a substantially vertical path of travel and adapted to hold a component subsequent to the lead severing and insert it into prealigned holes in said circuit board.

2. An apparatus as in claim 1 wherein said lead indexing and positioning mechanism and said lead severing means are adjacent said vertical path of travel of said insertion means.

3. An apparatus as in claim 2 wherein said lead indexing and positioning mechanism and said lead severing means are on opposite sides of said vertical path of travel of said insertion means.

4. An apparatus as in claim 1 wherein said insertion means includes two relatively movable vertically slidable members, and means to limit the relative movement between said members.

5. An apparatus as in claim 4 wherein one of said members includes a component driving head having means adapted to cooperatively engage a component body and adjacent lead material to insert it into a circuit board.

6. An apparatus as in claim 5 wherein said member further includes a pivotal jaw member having means to guide and retain a component lead as it is being inserted.

7. An apparatus as in claim 5 wherein said cooperative engagement means consists of a beveled surface terminating in a small substantially horizontal surface.

8. An apparatus as in claim 4 wherein one of said members includes a pivotal clenching jaw with a release means to allow said jaw to pivot, said other member having a slot means adapted to activate said release means to allow said jaw to pivot.

9. An apparatus as in claim 8 wherein said release means includes a pivoting spring biased latch with a threaded adjustment bolt protruding therethrough, said bolt end riding in said member slot, said latch jamming said jaw against movement until the bolt end rides out of the slot, thus pivoting said spring biased latch and allowing said jaw to pivot.

10. An apparatus as in claim 8 wherein said jaw carries a lead severing portion at its furthermost extremity.

11. An apparatus as in claim 4 wherein means to limit the relative movement between said members includes a housing, a dowel in said housing, a slot in a first of said members, said dowel adapted to ride in said slot and beveled apertures in said housing and said other member, a through aperture in said first member and a ball riding partially in said through aperture and partially in one of said beveled apertures.

12. An apparatus as in claim 1 wherein said component indexing and positioning means comprises a generally horizontally movable means.

13. An apparatus as in claim 12 wherein said horizontally movable means comprises a slidable supply mechanism and toothed indexing wheel, said toothed wheel adapted to rotate and pull the taped components from the supply mechanism and present them in proper position for operation of said component lead severing means.

14. An apparatus as in claim 13 wherein said horizontally movable means also includes a feed pawl which indexes the toothed indexing wheel two spaces upon each activation of said component indexing and positioning means.

15. An apparatus as in claim 13 wherein said horizontally movable means also includes an indexing pawl which is spring biased and maintains the position of said toothed indexing wheel when it is not rotating.

16. An apparatus as in claim 13 wherein said horizontally movable means includes relative movement means adapted to advance said indexing wheel into proper position for indexing a component into position for severing and to rotate said index wheel after said position is reached.

17. An apparatus as in claim 1 wherein said lead severing means comprises a jaw connected to said insertion means, an index wheel on said component indexing and positioning means and including a lead severing edge, a punch means adapted to engage a portion of said jaw means, said jaw means and lead severing edge cooperating to position component leads therebetween and sever them upon activation of said punch means.

18. A method of taking taped resistor leads having bodies and parallel extending leads and inserting them into predrilled circuit boards comprising:

a. providing a length of taped resistors, and
b. feeding them onto a grooved index wheel, and
c. rotating said index wheel and said components, and
d. severing the taped portion of said leads from the remaining portion, and
e. inserting said resistors into a circuit board.

19. A method as in claim 18 wherein said insertion step includes the steps of:

f. engaging the area adjacent the severance with a pair of jaws, and
g. engaging the top of said component body, and h. then allowing the ends of the severed leads to enter the predrilled circuit board, and i. rotating one jaw out of the way while allowing the other to act as a guide during insertion.

20. An insertion head for use on a component insertion apparatus, said head comprising a housing, means to mount said housing to a frame, a first slide member movable within said housing, said slide member carrying a pivotable jaw, a second member slidable within said first slide member, means providing limited relative movement between said first and second slide members, a second biased pivotable jaw located on said first slide member, means enabling said second slide member to pivot said second jaw, insertion rod means located at the bottom of said second slide means and adapted to engage a component body and with aide of said first jaw guide and push the component into prealigned holes in a circuit board.

21. An insertion head as in claim 20 wherein said insertion rod has a beveled face terminating in a substantially horizontal surface.

22. An insertion head as in claim 20 wherein said means providing limited relative movement between said members comprises a ball, concave apertures in said housing and said second slidable member and a through aperture in said first slidable member whereby said ball either allows or prevents relative movement between said first and second members.

* * * * *